(12) United States Patent
Sugiyama et al.

(10) Patent No.: US 7,742,203 B2
(45) Date of Patent: Jun. 22, 2010

(54) IMAGE READING APPARATUS

(75) Inventors: Takayuki Sugiyama, Utsunomiya (JP); Takeyoshi Saiga, Utsunomiya (JP); Kazuyuki Kondo, Saitama (JP); Toshio Takahashi, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 12/115,852

(22) Filed: May 6, 2008

(65) Prior Publication Data
US 2008/0278773 A1 Nov. 13, 2008

(30) Foreign Application Priority Data
May 7, 2007 (JP) .............................. 2007-122492

(51) Int. Cl.
*H04N 1/04* (2006.01)
(52) U.S. Cl. ........................ 358/497; 358/474; 358/482; 358/483; 359/850; 359/857; 359/861
(58) Field of Classification Search ................. 358/475, 358/474, 497, 483, 482, 505, 509, 512–514; 250/208.1, 239, 216, 234–236; 399/211; 359/850, 857, 861, 838, 196.1
See application file for complete search history.

(56) References Cited

U.S. PATENT DOCUMENTS

| | | | |
|---|---|---|---|
| 4,786,971 A | 11/1988 | Kaneko et al. | 358/209 |
| 4,991,030 A | 2/1991 | Sato et al. | 358/474 |
| 5,917,620 A | 6/1999 | Hasegawa et al. | 358/513 |
| 5,936,223 A | 8/1999 | Suzuki et al. | 235/462.01 |
| 6,172,784 B1 | 1/2001 | Konda | 359/196 |
| 6,359,706 B1 | 3/2002 | Arita et al. | 358/486 |
| 6,462,866 B1 | 10/2002 | Sugiyama et al. | 359/359 |
| 6,493,061 B1 | 12/2002 | Arita et al. | 355/41 |
| 6,563,608 B1 * | 5/2003 | Nakahara et al. | 358/475 |
| 6,631,014 B1 | 10/2003 | Aoshima et al. | 358/497 |
| 6,717,702 B1 | 4/2004 | Yamauchi et al. | 358/497 |
| 6,738,164 B1 | 5/2004 | Shimomura et al. | 358/474 |
| 6,829,008 B1 | 12/2004 | Kondo et al. | 348/302 |
| 6,924,913 B2 | 8/2005 | Sheng et al. | 359/212 |
| 2007/0109392 A1 * | 5/2007 | Kim et al. | 347/224 |

(Continued)

FOREIGN PATENT DOCUMENTS

JP 2001-189833 7/2001

*Primary Examiner*—Cheukfan Lee
(74) *Attorney, Agent, or Firm*—Fitzpatrick, Cella, Harper & Scinto

(57) ABSTRACT

An image reading apparatus includes an integral scanning optical unit in which a light source device for illuminating an original placed on an original table, a plurality of mirrors for reflecting a light beam from the original and an imaging optical system for imaging the light beam reflected by the mirrors, upon a reading device, are integrally accommodated, wherein at least one mirror is so configured that the light beam is incident thereon twice or more, wherein, in a sub-scan section, reflection surfaces of the mirrors are disposed in a space at an original-reading-position side of a light entrance surface of the imaging optical system, and wherein the reflection surface of a mirror disposed at a position optically closest to the light entrance surface of the imaging optical system is placed at a position furthermost from the original table with respect to a direction of a normal thereto, as compared with the reflection surfaces of the remaining mirrors.

7 Claims, 3 Drawing Sheets

U.S. PATENT DOCUMENTS

2007/0177223 A1* 8/2007 Kim .......................... 358/474
2008/0007810 A1* 1/2008 Liu .......................... 359/196
2008/0062475 A1 3/2008 Sugiyama et al. ........... 358/475
2008/0151329 A1 6/2008 Saiga ........................ 358/494

* cited by examiner

IMAGE READING APPARATUS

FIELD OF THE INVENTION AND RELATED ART

This invention relates to an image reading apparatus. More particularly, the present invention relates to an image reading apparatus suitable for use in devices such as an image scanner or a digital copying machine, for example, in which an integral scanning optical system unit including light source means, a plurality of mirrors, an imaging optical system and reading means is used to read imagewise information of an original.

Several proposals have conventionally been made with regard to image reading apparatuses for use in an image scanner or a digital copying machine (see Patent Document No. 1).

FIG. 4 is a schematic diagram of a main portion of an image reading apparatus having an integral scanning optical system unit.

The integral scanning optical system unit 507 (hereinafter, it will be referred to also as "carriage") shown in FIG. 4 comprises light source means (illumination source) 503 for illuminating an original 501 placed on an original table glass (original table) 502.

Furthermore, the carriage 507 comprises a line sensor (or an image sensor) 505 as reading means for reading a light beam from the original 501 being illuminated.

Furthermore, it comprises a plurality of scanning mirrors 504a-504d for directing the light beam from the original 501 to the line sensor 505, and an imaging optical system (imaging lens) 506 for imaging the light beam from the original 501 and based on the imagewise information, upon the line sensors 505 surface.

The carriage 507 structured as described above is scanningly moved by a driving motor (sub-scan motor) 508 as driving means, in the direction of an arrow A (sub-scan direction) shown in the drawing.

All the components that constitute the integral scanning optical system unit 507 are arranged to scan the original without changing the relative positional relationship of them.

In FIG. 4, the plurality of scanning mirrors include a first mirror 504a, a second mirror 504b, a third mirror 504c and a fourth mirror 504d. These mirrors are so disposed that the light beam from the original is directed from the first mirror 504a to the second mirror 504b, from the second mirror 504b to the third mirror 504c, and from the third mirror 504c to the fourth mirror 504d.

The light beam incident on the fourth mirror 504d is imaged by the imaging optical system 506, upon the line sensor 505 surface.

In the structure described above, the imagewise information of the original read by the line sensor 505 is applied to a predetermined image processing circuit (not shown) as an electrical signal and, after a predetermined signal processing is made, the signal is outputted.

Furthermore, the image reading apparatus comprises a power supply unit (not shown) to drive this device.

Furthermore, as shown in the drawing, there is spectral characteristic conditioning means 509 which is disposed on the light path between the imaging optical system 506 and the line sensor 505.

This spectral characteristic conditioning means 509 has a function for reducing infrared light components or visible light components included in the imagewise information.

As regards the structure thereof, a predetermined spectral characteristic is obtained by depositing different inorganic matters having different refractive indices, on a planar base glass surface in the shape of a multilayer film. By moving this base glass plate and inserting or retracting the same into or from the light path, imagewise information of a predetermined spectral characteristic is obtained.

An example of spectral characteristic is shown in FIG. 5.

In FIG. 5, denoted at 11 is the spectral characteristic of an infrared-light cut-off filter which blocks infrared light of wavelengths not shorter than 700 nm.

Denoted at 12 is the spectral characteristic of a visible-light cut-off filter which blocks visible light of wavelengths from 400 nm to 700 nm.

In this type of image reading apparatuses, reduction in size of the whole carriage has conventionally been desired.

Recently, the thickness of the main body of the device is becoming smaller and this strengthens the demand for further reduction in size of the carriage in the vertical direction.

Solutions for this problem may include a method in which the field angle of mainly the imaging optical system is widened to shorten the optical path length from the original to the line sensor, and a method in which the number of mirror reflections is increased to reduce the size of the whole carriage.

Several proposals have been made conventionally in regard to such image reading apparatus using these solutions (see Patent Document No. 2).

[Patent Documents]
1. Japanese Laid-Open Patent Application No. 2001-189833
2. U.S. Pat. No. 6,924,913

However, these image reading apparatuses may have the following inconveniences.

First of all, by the method making the imaging optical system field angle wider, the following problems will be raised. If the imaging optical system field angle is widened, it causes a decrease of the peripheral light quantity in proportion to the cosine 4th power law of the incidence field angle of the imaging optical system. This necessitates use of more powerful light source means.

Furthermore, since the aberration of the imaging optical system is enlarged, correct reading of imagewise information exactly corresponding to the imagewise information of the original, on the line sensor, becomes difficult to accomplish.

On the other hand, with the method in which the size of the whole carriage is decreased while increasing the number of mirror reflections, the following problems will be raised.

In the patent document No. 2, the first and second mirrors are constituted as a multiple reflection mirror to secure the space where the spectral conditioning means is to be placed.

However, as a result of that the mirrors constituting a multiple reflection mirror are disposed at the topmost position and bottommost position of the carriage, the size in the vertical direction within the sub-scan section becomes larger.

Furthermore, since the bottommost first mirror is a mirror which is longest in the longitudinal direction, reduction in size of the carriage bottom in the longitudinal reduction is very difficult.

SUMMARY OF THE INVENTION

The present invention provides an image reading apparatus by which reduction in size of an integral scanning optical system unit is accomplished and, furthermore, reduction in size of the overall system is achieved.

Specifically, in accordance with an aspect of the present invention, there is provided an image reading apparatus in which an integral scanning optical unit is moved in a sub-scan direction to read imagewise information of an original, said apparatus comprising: an integral scanning optical unit in which a light source device configured to illuminate an original placed on an original table, a plurality of mirrors configured to reflect a light beam from the original illuminated by said light source device and an imaging optical system configured to image the light beam reflected by said plurality of mirrors, upon a reading device, are integrally accommodated; wherein at least one of said plurality of mirrors is so configured that the light beam is incident thereon twice or more, wherein, in a sub-scan section, reflection surfaces of said plurality of mirrors are disposed in a space at an original-reading-position side of a light entrance surface of said imaging optical system, and wherein the reflection surface of a mirror disposed at a position optically closest to the light entrance surface of said imaging optical system is placed at a position furthermost from said original table with respect to a direction of a normal thereto, as compared with the reflection surfaces of the remaining mirrors.

In one preferred form of this aspect of the present invention, said plurality of mirrors are comprised of four mirrors, and wherein, in the sub-scan section, the reflection surface of the mirror on which the light beam is incident twice or more and the reflection surface of the mirror disposed at the position optically closest to the light entrance surface of said imaging optical system are parallel to each other.

Said plurality of mirrors may be comprised of first, second, third and fourth mirrors, and the first, second, third and fourth mirrors may be so disposed that the light beam from the original is reflected by the first mirror and then is incident on the second mirror, that the light beam reflected by the second mirror passes across a light path between the original and the first mirror in the sub-scan section and is subsequently incident on the third mirror, that the light beam reflected by the third mirror passes again across the light path between the original and the first mirror and subsequently passes across a light path between the first mirror and the second mirror and it is subsequently incident on the second mirror again, that the light beam reflected by the second mirror is incident on the fourth mirror, and that the light beam reflected by the fourth mirror is incident on said imaging optical system.

Said plurality of mirrors may be comprised of first, second, third and fourth mirrors, and the first, second, third and fourth mirrors may be so disposed that the light beam from the original is reflected by the first mirror and then is incident on the second mirror, that the light beam reflected by the second mirror is incident on the third mirror, that the light beam reflected by the third mirror passes across a light path between the first mirror and the second mirror and is subsequently incident on the second mirror again, that the light beam reflected by the second mirror is incident on the fourth mirror, and that the light beam reflected by the fourth mirror is incident on said imaging optical system.

The fourth mirror and said imaging optical system may be disposed at a position more spaced-apart from the original table in a direction of a normal thereto, as compared with the first, second and third mirrors.

The fourth mirror and said imaging optical system may be disposed at a position more spaced-apart from the original table in a direction of a normal thereto, as compared with the first, second and third mirrors.

When in the sub-scan section a distance to the original table from a center of the reflection surface of the mirror disposed furthermost from the original table in the direction of a normal thereto is denoted by a and a largest distance between centers of the reflection surfaces of said plurality of mirrors in the sub-scan direction is denoted by b, conditions $0.65 < a/b < 1.0$ and $a < 30.0$ mm may be satisfied.

When in the sub-scan section a distance to the original table from a center of the reflection surface of the mirror disposed furthermost from the original table in the direction of a normal thereto is denoted by a and a distance to the original table from a barrel which holds said imaging optical system is denoted by c, conditions $0.5 < c/a < 0.7$ and $a < 30.0$ mm may be satisfied.

In summary, in accordance with the present invention, an image reading apparatus which enables reduction in size of an integral scanning optical system unit as well as reduction in size of the overall system, can be achieved.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
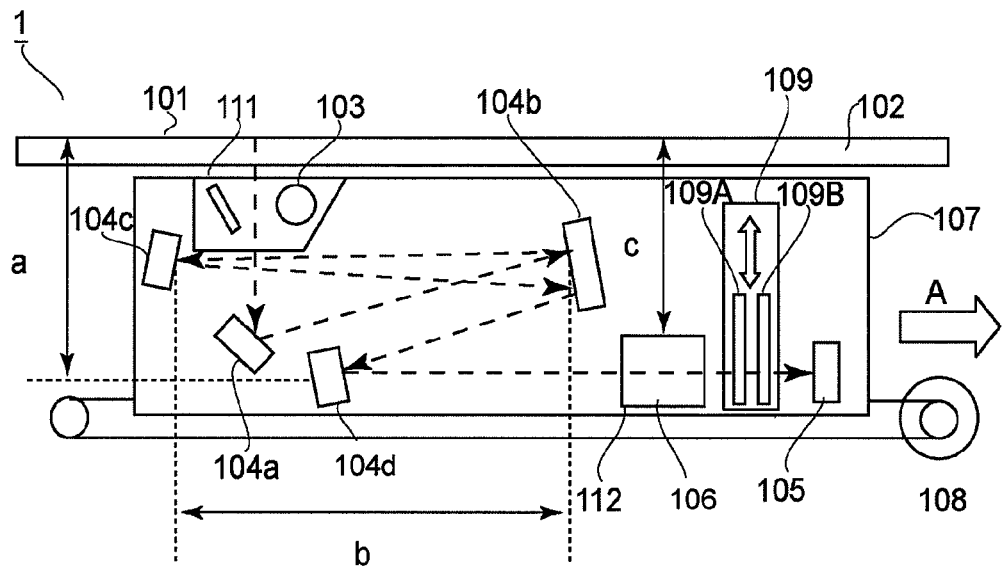
FIG. 1 is a schematic diagram of a main portion of a first embodiment of the present invention.

FIG. 1 is a schematic diagram of a main portion of an image reading apparatus according to a first embodiment of the present invention.

FIG. 1 illustrates an example wherein the image reading apparatus of the present invention is applied to an image scanner device.

It should be noted that, in the following description, the lateral (left-and-right) direction of the carriage 107 concerns the direction in which the carriage 107 is driven by driving means (sub-scan motor) 108, and it corresponds to the sub-scan direction.

Furthermore, the vertical direction of the carriages concerns the direction of a normal (vertical direction) to the original surface 101. The upward direction concerns the direction at the original surface 101 side, and the downward direction concerns the direction opposite to it.

The main-scan direction refers to the direction of the array of the picture elements of the reading means 105 (i.e., a direction perpendicular to the sheet of the drawing). Furthermore, the word "optic" or "optically" is used in the embodiments of the present invention with respect to the direction in which the light beam advances.

Denoted in FIG. 1 at 1 is the main body of an image reading apparatus, and denoted at 102 is an original table (original table glass). An original 101 is placed on the surface of the original table 102.

Denoted at 107 is an integral scanning optical system unit. This unit integrally accommodates therein light source means 103, a plurality of scanning mirrors 104a-104d, an imaging optical system 106 and reading means 105 to be described below. The integral scanning optical system unit 107 is scanningly moved in the sub-scan direction (in the direction of an arrow A in FIG. 1) by means of a driving device 108 such as a motor, for example, to read the imagewise information of the original 101.

The integral scanning optical system unit 107 and the original 101 may be relatively moved relative to each other, to read the imagewise information of the original 101.

Hereinafter, the integral scanning optical system unit 107 will be referred to also as a "carriage".

Denoted at 103 is light source means. It comprises a fluorescent lamp or a halogen lamp, and it illuminates the original 101 placed on the original table 102.

Denoted at 104a, 104b, 104c and 104d are first, second, third and fourth mirrors, respectively. These mirrors are disposed at positions to be described below, to reflect the light beam from original 101.

Denoted at 106 is an imaging optical system (imaging lens). It functions to image the light beam based on the imagewise information of the original 101 and reflected by the plurality of mirrors 104a, 104b, 104c and 104d, upon the surface of the reading means 105.

Denoted at 105 is this reading means, and it comprises charge coupled devices of a line sensor (or image sensor). Here, a plurality of reading picture-elements are disposed at the imaging position of the imaging optical system 106 and in the main-scan direction.

Denoted at 108 is a sub-scan motor as the driving device, and it moves the carriage 107 in the sub-scan direction.

Denoted at 112 is a holding barrel for holding the imaging optical system 106.

Denoted at 109 is spectral characteristic conditioning means which is disposed on the light path between the imaging optical system 106 and the reading means 105. It has a function for reducing infrared light components or visible light components included in the imagewise information, by which a particular image can be obtained in accordance with the need.

The spectral characteristic conditioning means 109 of the present embodiment is so structured that two high-polymer multilayered-film filters 109A and 109B can be inserted and retracted into and from the light path between the imaging optical system 106 and the reading means 105.

In accordance with the need, one of the two high-polymer multilayered-film filters 109A and 109B is selectively inserted so that it is placed on the light path.

The high-polymer multilayered-film filter 109A has a function (spectral characteristic) for reducing the infrared light. Hereinafter, this will be referred to as an "infrared light cut-off filter".

On the other hand, the high-polymer multilayered-film filter 109B has a function (spectral characteristic) for reducing visible light. Hereinafter, this will be referred to as a "visible-light cut filter".

Figure 5:
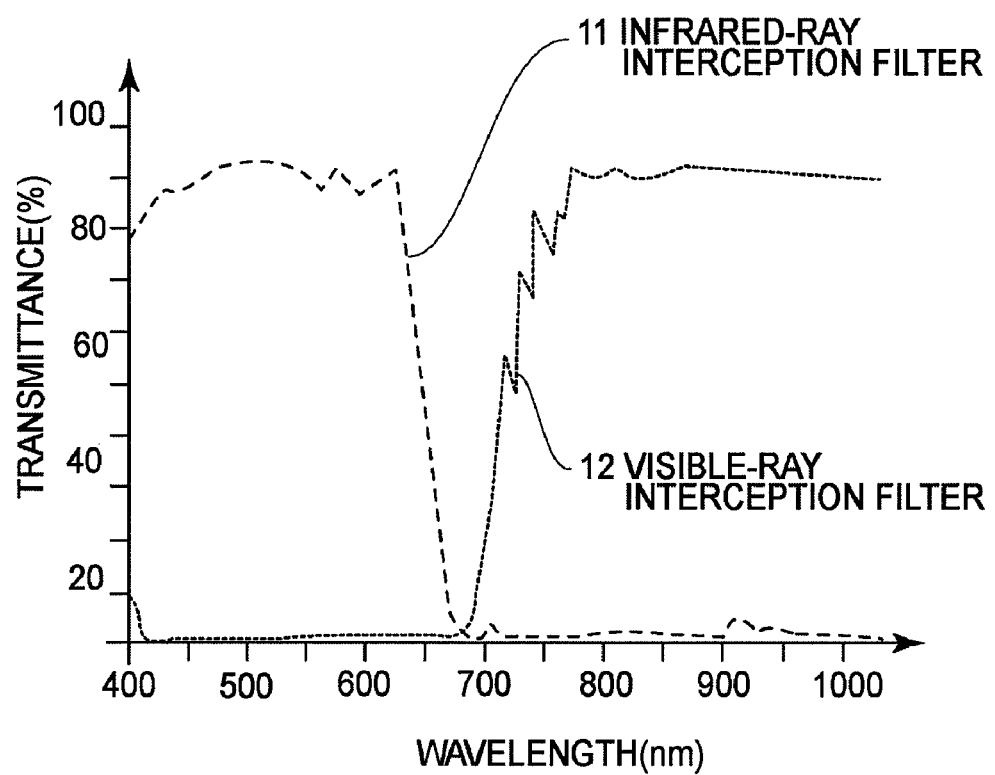
FIG. 5 is a graph illustrating the characteristic of conventional spectral characteristic conditioning means.

These high-polymer multilayered-film filters 109A and 109B have a spectral transmittance equivalent to the spectral transmittance shown in FIG. 5.

The plurality of scanning mirrors are comprised of four mirrors, that is, first, second, third and fourth mirrors 104a, 104b, 104c and 104d.

In this embodiment, these mirrors are so configured that the light beam from the original 101 is reflected by the first mirror 104a and, thereafter, it is incident on the second mirror 104b.

Furthermore, the mirrors are so configured that the light beam reflected by the second mirror 104b passes while crossing the light beam between the original 101 and the first mirror 104a and, thereafter, it is incident on the third mirror 104c.

Furthermore, the mirrors are so configured that the light beam reflected by the third mirror 104c passes while crossing again the light beam between the original 101 and the first mirror 104a and, thereafter, it passes across the light path between the first mirror 104a and the second mirror 104b and is subsequently incident on the second mirror 104b again.

Furthermore, the mirrors are so configured that the light beam reflected by the second mirror 104b is incident on the fourth mirror 104d and that the light beam reflected by the fourth mirror 104d is incident on the imaging optical system 106.

Furthermore, in the present embodiment, the light beam is incident twice or more upon at least one of the plurality of mirrors 104a, 104b, 104c and 104d (second mirror (multiple reflection mirror) 104b in this embodiment).

Furthermore, within the sub-scan section, all the reflection surfaces of the plurality of mirrors 104a, 104b, 104c and 104d are disposed in the space which is at the original-reading-position-side of the light entrance surface of the imaging optical system 106.

Furthermore, the reflection surface of the fourth mirror 104d which is at a position optically closest to the light entrance surface of the imaging optical system 106 is disposed at a position furthermost from the original table 102 in the direction of a normal thereto, as compared with the reflection surfaces of the other mirrors.

Furthermore, within the sub-scan section, the reflection surface of the second mirror 104b on which the light beam is incident twice or more and the reflection surface of the fourth mirror 104d disposed at a position optically closest to the light entrance surface of the imaging optical system 106, are made parallel to each other.

Furthermore, the fourth mirror 104d and the imaging optical system 106 are disposed at a position more spaced-apart from the original table 102 in the direction of a normal thereto, as compared with the first, second and third mirrors 104a, 104b and 104c.

In the present embodiment, the light beam emitted by the illumination system 111 including light source means 103 and placed within the carriage 107 illuminates the bottom face of the original 101.

Subsequently, a portion of diffused light beam from the original 101 advances vertically downwardly as viewed in FIG. 1, and it is incident on the first mirror 104a placed below the carriage 107.

The light beam incident on the first mirror 104a is reflected thereby at a particular angle, rightwardly and upwardly of the carriage 107, and it is incident on the second mirror 104b placed at the right-hand side of the carriage 107.

The light beam incident on the second mirror 104b is reflected thereby at a particular angle, leftwardly of the carriage 107, and it is incident on the third mirror 104c placed on the left-hand side of the light source means 103.

The light beam incident on the third mirror 104c is reflected thereby at a particular angle, rightwardly of the carriage 107, and it is incident again on the second mirror 104b.

The light beam incident on the second mirror 104b is reflected thereby at a particular angle, leftwardly and downwardly of the carriage 107, and it is incident on the fourth mirror 104d placed at the lowermost end of the carriage 107.

The light beam (principal ray) incident on the fourth mirror 104d is reflected thereby in a horizontal direction relative to the original 101 surface, and it is directed by the imaging optical system 106 through the spectral characteristic conditioning means 109 which is placed between the imaging optical system 106 and the line sensor 105. Then, the light beam is imaged on the line sensor 105 surface.

By moving the carriage 107 in the direction of an arrow A (sub-scan direction) shown in FIG. 1, the imagewise information of the original 101 is read.

In the present embodiment, when an image (visible image) of the original 101 as well as any defect of the original 101 (infrared image) are going to be read, the original 101 is illuminated with the same light source means 103 which comprises the components of infrared light and visible light.

Also, when an image of the original 101 which is a film is going to be read, the infrared-light cut-off filter 109A is inserted to be located at the light path, and image reading is carried out.

Furthermore, for reading of any foreign particle or scratch of the original 101, the visible-light cut-off filter 109B is inserted to be located at the light path, and the reading of the defect of the original 101 is carried out.

Then, based on the particle or scratch range information on the original having been read by use of the infrared light, any defect of the imagewise information read by use of the visible light is restored.

In the carriage 107 of the present embodiment, as described above, all the reflection surface of the plurality of scanning mirrors 104a, 104b, 104c and 104d are disposed at the original 101 reading position side of the light incidence surface of the imaging optical system 106.

With this arrangement, in the sub-scan section, the space for accommodating and driving the spectral characteristic conditioning means 109 can be defined above the imaging optical system 106.

Furthermore, by using a multiple reflection mirror as the second mirror 104b, the size of the carriage 107 in the vertical direction as well as in the lateral direction can be made smaller while keeping the above-described space.

Figure 2:
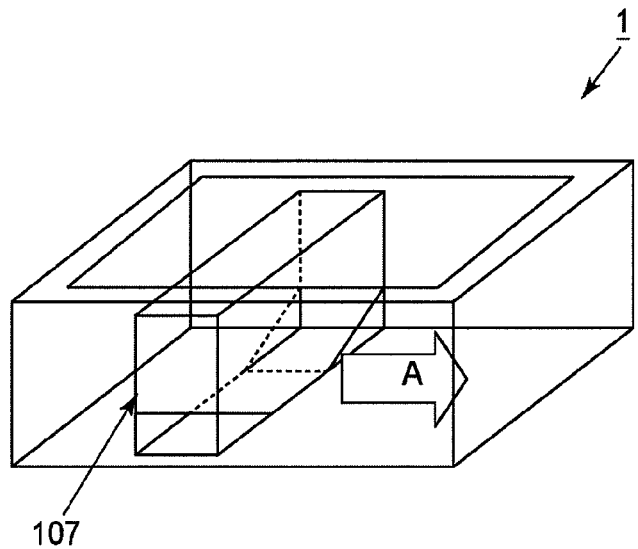
FIG. 2 is perspective view of a main portion of the first embodiment of the present invention.

Furthermore, the fourth mirror 104d which is short in the lengthwise direction is disposed at the lowermost portion of the carriage 107. As a result of this, only the imaging optical system 106, line sensor 105 and fourth mirror 104d which are comparatively small in size have to be disposed at the bottom of the carriage 107. Hence, the bottom of the carriage 107 can be made small in size, as seen from FIG. 2.

Furthermore, an empty space is created inside the image scanner main body, and a power supply and an image processing circuitry which are conventionally placed at other places can be accommodated in such space. This contributes to reduction in size of the overall system.

It should be noted here that, in the present embodiment, the disposition of the mirrors is not limited to the one described above, and they may be disposed in the following manner.

Namely, the mirrors may be so disposed that the light beam from the original 101 is reflected by the first mirror 104a and subsequently it is incident on the second mirror 104b, and that the light beam reflected by the second mirror 104b passes across the light beam between the original 101 and the first mirror 104a.

Furthermore, the mirrors may be so disposed that the light beam incident on the third mirror 104c and reflected by the third mirror 104c passes again across the light beam between the original 101 and the first mirror 104a and subsequently incident again on the second mirror 104b, without passing across the light path between the first mirror 104a and the second mirror 104b.

Furthermore, the mirrors may be so disposed that the light beam reflected by the second mirror 104b is incident on the fourth mirror 104d, and the light beam reflected by the fourth mirror 104d is incident on the imaging optical system 106.

In the present embodiment, if in the sub-scan section the distance to the original table 102 from the center of the reflection surface of the fourth mirror 104d disposed at a position furthermost from the original table 102 in the direction of a normal thereto is denoted by a, and the largest distance between the centers of the reflection surfaces of the plurality of mirrors in the sub-scan direction is denoted by b, then the following conditions are satisfied.

$$0.65 < a/b < 1.0 \tag{1}$$

$$a < 30.0 \text{ mm} \tag{2}$$

Conditional expressions (1) and (2) are conditions for setting the optimum spacing disposition of the mirrors. By satisfying all conditional expressions (1) and (2), optimum mirror disposition is accomplished such that, in the sub-scan section, reduction in size with respect to the vertical direction and the lateral direction is accomplished.

In the image reading apparatus of the present embodiment shown in FIG. 1, a=28.5 mm b=41.4 mm When these numerical values are applied to conditional expressions (1) and (2), it follows that:

$a/b=0.69$             Conditional expression (1)

$a(28.5 \text{ mm}) < 30.0 \text{ mm}$        Conditional expression (2).

This completely satisfies conditional expressions (1) and (2).

Furthermore, in the present embodiment, if in the sub-scan section the distance to the original table 102 from the imaging optical system barrel 112 which holds the imaging optical system 106 is denoted by c, then the following conditions are satisfied.

$$0.5 < c/a < 0.7 \tag{3}$$

$$a < 30.0 \text{ mm} \tag{2}$$

Conditional expressions (2) and (3) are conditions for securing the space which is necessary for the spectral characteristic conditioning means 109 inside the carriage 107. By satisfying all the conditional expressions (2) and (3), reduction in size of the carriage 107 main body is accomplished while taking an appropriate space.

In the image reading apparatus of the present embodiment shown in FIG. 1, a=28.5 mm c=18.0 mm When these numerical values are applied to conditional expressions (2) and (3), it follows that:

$$c/a = 0.63 \quad \text{Conditional expression (3)}$$

$$a(28.5\text{ mm}) < 30.0\text{ mm} \quad \text{Conditional expression (2)}.$$

This satisfies conditional expressions (2) and (3).

It should be noted here that, more preferably in the present embodiment, the above conditional expressions (1)-(3) had better be set as follows.

$$0.65 < a/b < 0.80 \tag{1a}$$

$$a < 29\text{ mm} \tag{2a}$$

$$0.55 < c/a < 0.65 \tag{3a}$$

As described above, in accordance with the present embodiment, in an image reading apparatus having a carriage, the disposition of the components including a plurality of mirrors is set appropriately and, based on this, reduction in size of the integral scanning optical system unit as well as reduction in size of the overall system is accomplished while securing the space for the spectral characteristic conditioning means.

It should be noted that the imaging optical system 106 is not limited to a lens system. It may include a curved reflection surface or, alternatively, it may be comprised of only curved reflection surfaces.

Embodiment 2

Figure 3:
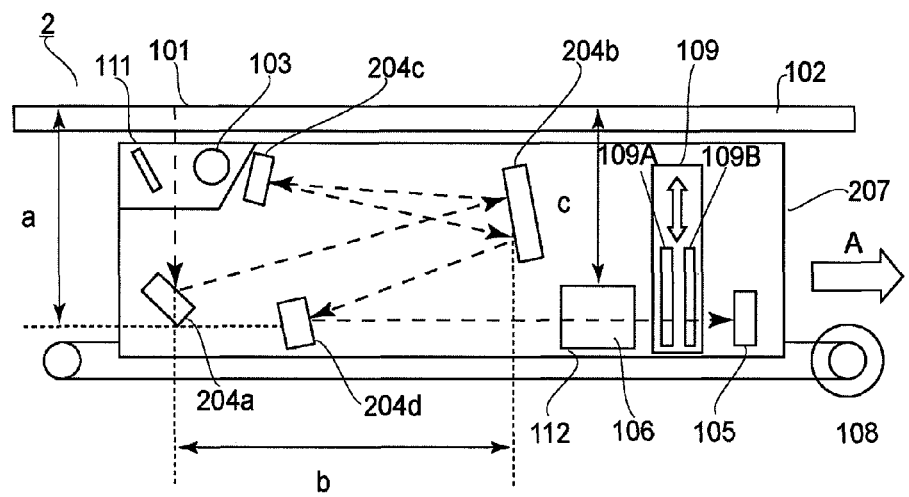
FIG. 3 is a schematic diagram of a main portion of a second embodiment of the present invention.

FIG. 3 is a schematic diagram of a main portion of a second embodiment wherein an image reading apparatus of the present invention is applied to a device such as an image scanner, for example. In FIG. 3, like numerals are assigned to components corresponding to those of FIG. 1.

The present embodiment differs from the abovementioned first embodiment in that a third mirror 204c is disposed at the right-hand side of the light source means 103 within the sub-scan section and, like the FIG. 1 embodiment a carriage 207 is constituted by disposing the fourth mirror 204d and the imaging optical system 106 at the bottom of the carriage 207.

The remaining structure and optical function are similar to the first embodiment and, based on this, similar advantageous results are obtained.

More specifically, a plurality of scanning mirrors are comprised of four mirrors, that is, first, second, third and fourth mirrors 204a, 204b, 204c and 204d.

In this embodiment, these mirrors are disposed so that the light beam from the original 101 is reflected by the first mirror 204a and subsequently it is incident on the second mirror 204b, and that the light beam reflected by the second mirror 204b is incident on the third mirror 204c.

Furthermore, these mirrors are disposed so that the light beam reflected by the third mirror 204c passes across the light path between the first mirror 204a and the second mirror 204b and subsequently it is incident on the second mirror 204b again.

Furthermore, these mirrors are disposed so that the light beam reflected by the second mirror 204b is incident on the fourth mirror 204d which is parallel to the second mirror 204b.

Furthermore, these mirrors are disposed so that the light beam reflected by the fourth mirror 204d is incident on the imaging optical system 206.

In the present embodiment, the light beam emitted by the illumination system 111 including the light source means 103 and placed within the carriage 207 illuminates the bottom face of the original 101.

Subsequently, a portion of diffused light beam from the original 101 advances vertically downwardly as viewed in FIG. 4, and it is incident on the first mirror 204a placed below the carriage 107.

The light beam incident on the first mirror 204a is reflected thereby at a particular angle, rightwardly and upwardly of the carriage 207, and it is incident on the second mirror 204b placed at the right-hand side of the carriage 207.

The light beam incident on the second mirror 204b is reflected thereby at a particular angle, leftwardly of the carriage 207, and it is incident on the third mirror 204c placed on the right-hand side of the light source means 103.

The light beam incident on the third mirror 204c is reflected thereby at a particular angle, rightwardly of the carriage 207, and it is incident again on the second mirror 204b.

The light beam incident on the second mirror 204b is reflected thereby at a particular angle, leftwardly and downwardly of the carriage 207, and it is incident on the fourth mirror 204d placed at the lower end of the carriage 207.

The light beam (principal ray) incident on the fourth mirror 204d is reflected thereby in a horizontal direction relative to the original 101 surface, and it is directed by the imaging optical system 106 through the spectral characteristic conditioning means 109 which is placed between the imaging optical system 106 and the line sensor 105. Then, the light beam is imaged on the line sensor 105 surface.

Figure 4:
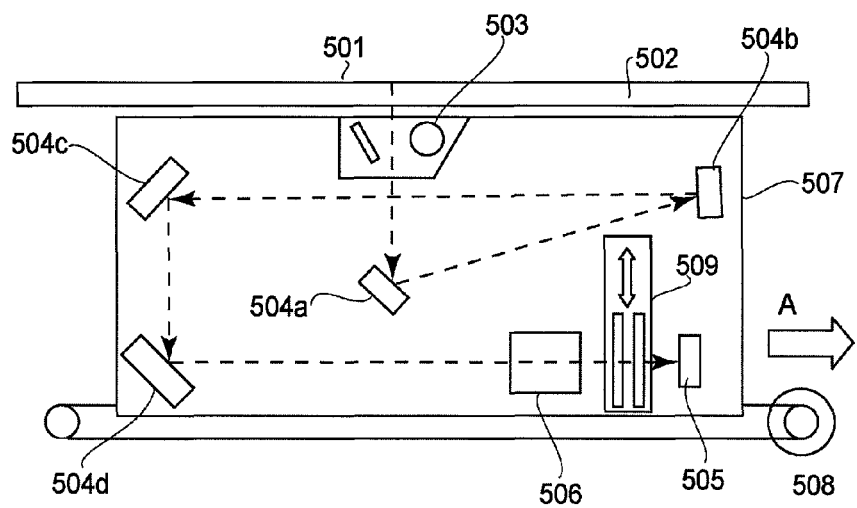
FIG. 4 is a schematic diagram of a main portion of a conventional image reading apparatus.

By moving the carriage 207 in the direction of an arrow A (sub-scan direction) shown in FIG. 4, the imagewise information of the original 101 is read.

In the present embodiment as well, when an image (visible image) of the original 101 and any defect of the original 101 (infrared image) are going to be read, the original 101 is illuminated with the same light source means 103 which comprises the components of infrared light and visible light.

Also, when an image of the original 101 which is a film is going to be read, the infrared-light cut-off filter 109A is inserted to be located at the light path, and image reading is carried out.

Furthermore, for reading of any foreign particle or scratch of the original 101, the visible-light cut-off filter 109B is inserted to be located at the light path, and the reading of the defect of the original 101 is carried out.

Then, based on the particle or scratch range information on the original having been read by use of the infrared light, any defect of the imagewise information read by use of the visible light is restored.

It should be noted here that, in the present embodiment, the disposition of the mirrors is not limited to the one described above, and they may be disposed in the following manner.

Namely, the mirrors may be so disposed that the light beam from the original 101 is reflected by the first mirror 204a and subsequently it is incident on the second mirror 204b, and that the light beam reflected by the second mirror 204b is incident on the third mirror 204c.

Furthermore, the mirrors may be so disposed that the light beam reflected by the third mirror 204c is incident again on the second mirror 204b and the light beam reflected by the second mirror 204b passes again across the light path between the first mirror and the second mirror and subsequently is incident on the fourth mirror.

Furthermore, the mirrors may be so disposed that the light beam reflected by the fourth mirror is incident on the imaging optical system 106.

Furthermore, conditional expressions (1) and (2) for setting the disposition of the as well as conditional expressions (2) and (3) for securing the space for accommodating and driving the spectral characteristic conditioning means 109 are as follows, in the image reading apparatus of the present embodiment shown in FIG. 3.

a=28.5 mm b=37.5 mm c=18.0 mm

If these numerical values are applied to conditional expressions (1), (2) and (3), it follows that:

| | |
|---|---|
| a/b=0.76 | Conditional expression (1) |
| a(28.5 mm)<30.0 mm | Conditional expression (2) |
| c/a=0.63 | Conditional expression (3) |

This completely satisfies conditional expressions (1), (2) and (3).

It should be noted that, in the present invention, the components of the integral scanning optical system unit may be configured in any way other than that of the preceding embodiments, provided that the structural features as defined in the claims to be set forth below are satisfied. Similar advantageous results are obtainable with such structure.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-122492 filed May 7, 2007, for which is hereby incorporated by reference.

What is claimed is:

1. An image reading apparatus in which an integral scanning optical unit is moved in a sub-scan direction to read imagewise information of an original, said apparatus comprising:

an integral scanning optical unit in which a light source device configured to illuminate an original placed on an original table, a plurality of mirrors configured to reflect a light beam from the original illuminated by said light source device and an imaging optical system configured to image the light beam reflected by said plurality of mirrors, upon a reading device, are integrally accommodated;

wherein at least one of said plurality of mirrors is so configured that the light beam is incident thereon twice or more, wherein, in a sub-scan section, reflection surfaces of said plurality of mirrors are disposed in a space at an original-reading-position side of a light entrance surface of said imaging optical system, wherein the reflection surface of a mirror disposed at a position optically closest to the light entrance surface of said imaging optical system is placed at a position furthermost from said original table with respect to a direction of a normal thereto, as compared with the reflection surfaces of the remaining mirrors; and wherein said plurality of mirrors are comprised of four mirrors, and wherein, in the sub-scan section, the reflection surface of the mirror on which the light beam is incident twice or more and the reflection surface of the mirror disposed at the position optically closest to the light entrance surface of said imaging optical system are parallel to each other.

2. An image reading apparatus according to claim 1, wherein said four mirrors are comprised of first, second, third and fourth mirrors, and wherein the first, second, third and fourth mirrors are so disposed that the light beam from the original is reflected by the first mirror and then is incident on the second mirror, that the light beam reflected by the second mirror passes across a light path between the original and the first mirror in the sub-scan section and is subsequently incident on the third mirror, that the light beam reflected by the third mirror passes again across the light path between the original and the first mirror and subsequently passes across a light path between the first mirror and the second mirror and it is subsequently incident on the second mirror again, that the light beam reflected by the second mirror is incident on the fourth mirror, and that the light beam reflected by the fourth mirror is incident on said imaging optical system.

3. An image reading apparatus according to claim 2, wherein the fourth mirror and said imaging optical system are disposed at a position more spaced-apart from the original table in a direction of a normal thereto, as compared with the first, second and third mirrors.

4. An image reading apparatus according to claim 1, wherein said four mirrors are comprised of first, second, third and fourth mirrors, and wherein the first, second, third and fourth mirrors are so disposed that the light beam from the original is reflected by the first mirror and then is incident on the second mirror, that the light beam reflected by the second mirror is incident on the third mirror, that the light beam reflected by the third mirror passes across a light path between the first mirror and the second mirror and is subsequently incident on the second mirror again, that the light beam reflected by the second mirror is incident on the fourth mirror, and that the light beam reflected by the fourth mirror is incident on said imaging optical system.

5. An image reading apparatus according to claim 4, wherein the fourth mirror and said imaging optical system are disposed at a position more spaced-apart from the original table in a direction of a normal thereto, as compared with the first, second and third mirrors.

6. An image reading apparatus in which an integral scanning optical unit is moved in a sub-scan direction to read imagewise information of an original, said apparatus comprising:

an integral scanning optical unit in which a light source device configured to illuminate an original placed on an original table, a plurality of mirrors configured to reflect a light beam from the original illuminated by said light source device and an imaging optical system configured to image the light beam reflected by said plurality of mirrors, upon a reading device, are integrally accommodated;

wherein at least one of said plurality of mirrors is so configured that the light beam is incident thereon twice or more, wherein, in a sub-scan section, reflection surfaces of said plurality of mirrors are disposed in a space at an original-reading-position side of a light entrance surface of said imaging optical system, wherein the reflection surface of a mirror disposed at a position optically closest to the light entrance surface of said imaging optical system is placed at a position furthermost from said original table with respect to a direction of a normal thereto, as compared with the reflection surfaces of the remaining mirrors; and wherein, when in the sub-scan section a distance to the original table from a center of the reflection surface of the mirror disposed furthermost from the original table in the direction of a normal thereto is denoted by a and a largest distance between centers of the reflection surfaces of said plurality of mirrors in the sub-scan direction is denoted by b, conditions $0.65 < a/b < 1.0$ and $a < 30.0$ mm are satisfied.

7. An image reading apparatus in which an integral scanning optical unit is moved in a sub-scan direction to read imagewise information of an original, said apparatus comprising:
 an integral scanning optical unit in which a light source device configured to illuminate an original placed on an original table, a plurality of mirrors configured to reflect a light beam from the original illuminated by said light source device and an imaging optical system configured to image the light beam reflected by said plurality of mirrors, upon a reading device, are integrally accommodated;
 wherein at least one of said plurality of mirrors is so configured that the light beam is incident thereon twice or more,
 wherein, in a sub-scan section, reflection surfaces of said plurality of mirrors are disposed in a space at an original-reading-position side of a light entrance surface of said imaging optical system,
 wherein the reflection surface of a mirror disposed at a position optically closest to the light entrance surface of said imaging optical system is placed at a position furthermost from said original table with respect to a direction of a normal thereto, as compared with the reflection surfaces of the remaining mirrors; and
 wherein, when in the sub-scan section a distance to the original table from a center of the reflection surface of the mirror disposed furthermost from the original table in the direction of a normal thereto is denoted by a and a distance to the original table from a barrel which holds said imaging optical system is denoted by c, conditions $0.5 < c/a < 0.7$ and $a < 30.0$ mm are satisfied.

* * * * *